(12) United States Patent
Chen (10) Patent No.: US 6,726,752 B2
(45) Date of Patent: Apr. 27, 2004

(54) WATER REMOVER FOR AN AIR COMPRESSOR SYSTEM

(75) Inventor: Po-Huei Chen, Changhua Hsien (TW)

(73) Assignee: Jack Lee (TW)

( * ) Notice: Subject to any disclaimer, the term of this patent is extended or adjusted under 35 U.S.C. 154(b) by 0 days.

(21) Appl. No.: 10/189,021

(22) Filed: Jul. 2, 2002

(65) Prior Publication Data

US 2003/0010212 A1 Jan. 16, 2003

(30) Foreign Application Priority Data

Jul. 12, 2001 (CN) .......................................... 01231352 U (51) Int. Cl.[7] .............................................. B01D 45/08
(52) U.S. Cl. .............................. 96/190; 55/319; 55/446; 55/462; 55/DIG. 17
(58) Field of Search ........................... 96/188, 189, 190, 96/416; 55/319, 446, 462, 445, DIG. 17

(56) References Cited

U.S. PATENT DOCUMENTS

| | | | | |
|---|---|---|---|---|
| 1,088,187 A | * | 2/1914 | Theisen ........................ | 55/355 |
| 2,162,550 A | * | 6/1939 | Frankford .................... | 55/446 |
| 2,377,549 A | * | 6/1945 | Gustafsson et al. .......... | 55/318 |
| 5,017,201 A | * | 5/1991 | Park ............................ | 96/228 |

* cited by examiner

*Primary Examiner*—Robert A. Hopkins
(74) *Attorney, Agent, or Firm*—Charles E. Baxley (57) ABSTRACT

A water remover for an air compressor system has a housing and at least one baffle mounted in the housing to define a tortuous air-flowing channel in the housing. Accordingly, the moisture in the high-pressured air will condense on the surface of the housing and the baffle when the air flows through the tortuous channel. Only little power is needed for the operation of the water remover, and the structure of the water remover is simple.

10 Claims, 9 Drawing Sheets

WATER REMOVER FOR AN AIR COMPRESSOR SYSTEM

BACKGROUND OF THE INVENTION

1. Field of the Invention

The present invention relates to a water remover, and more particularly to a water remover for an air compressor system and that can remove water from the high-pressured air efficiently.

2. Description of Related Art

Figure 9:
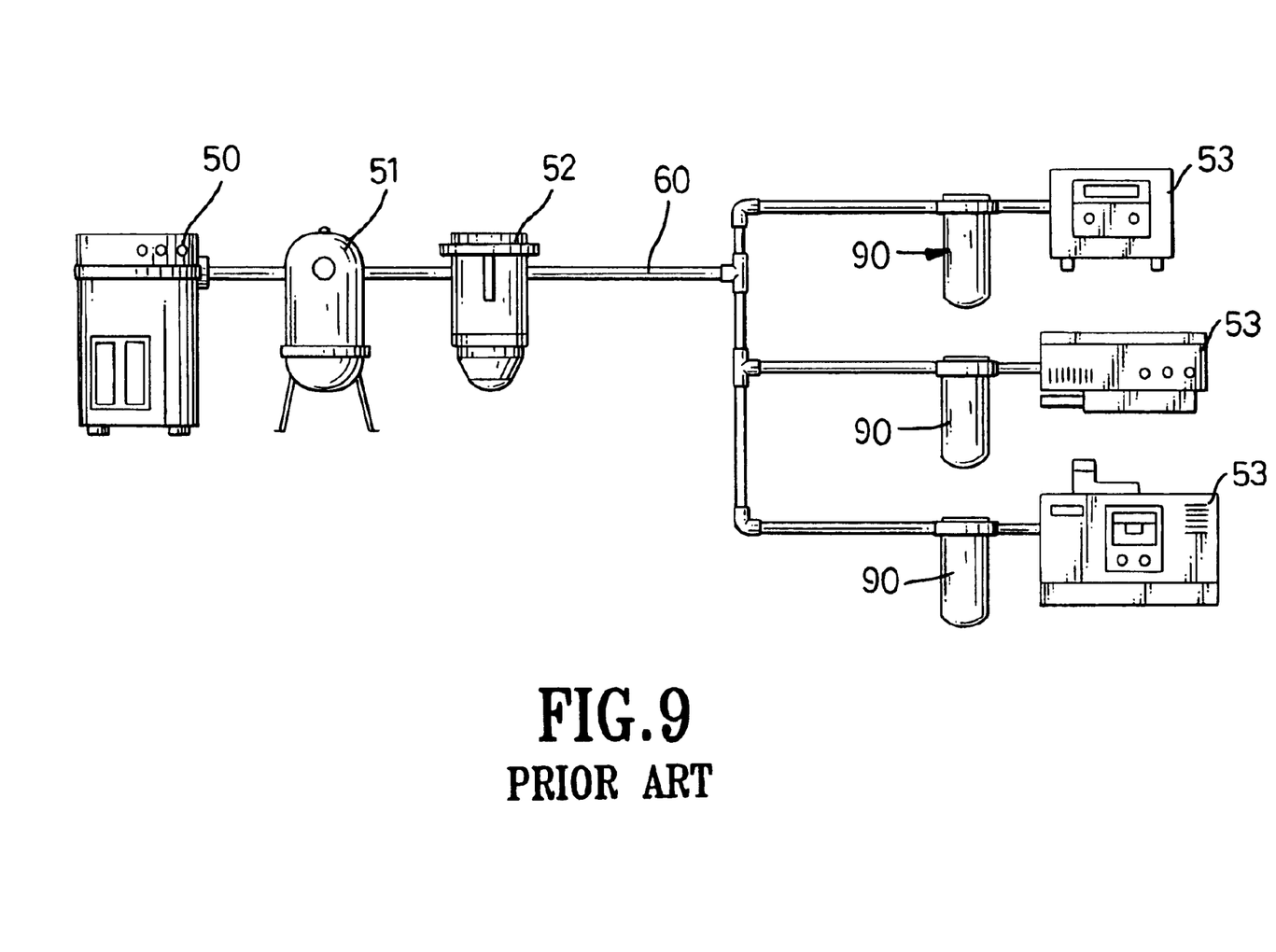
FIG. 9 is a plan view of a conventional air compressor system in accordance with the prior art.

With reference to FIG. 9, a conventional air compressor system comprises an air compressor (50), an air tank (51), a filter (52), a water remover (90) and a pipe (60) connecting the aforementioned devices to a terminal machine (53). The air is compressed to a high pressure by the air compressor (50) and is stored in the air tank (51) at the high pressure. The filter (52) is used to remove the impurities such as dust or oil, and the water remover (90) is used to remove the moisture in the air, such that the terminal machine (53) can be kept from being damaged by the impurities and moisture contained in the air.

However, the conventional water remover (90) needs power for operation, and the use of the conventional water remover (90) is inefficiently. In addition, the structure of the conventional water remover (90) is complex, such that the cost for manufacturing the conventional water remover (90) is high. To overcome the shortcomings, the present invention tends to provide a water remover to mitigate or obviate the aforementioned problems.

SUMMARY OF THE INVENTION

The main objective of the invention is to provide a water remover for an air compressor system and the water remover has a simplified structure. The water remover has a housing and at least one baffle mounted in the housing to defined a tortuous air-flowing channel in the housing. Accordingly, the moisture in the high-pressured air will condense on the surface of the housing and the baffle when the air flows through the tortuous channel. Only little power is needed for the operation of the water remover.

Other objects, advantages and novel features of the invention will become more apparent from the following detailed description when taken in conjunction with the accompanying drawings.

Appendix is a copy of a testing report for a water remover in accordance with the present invention and issued by the Energy & Resources Laboratories in Technology Transfer And Services Center of Industrial Technology Research Institute in Taiwan, and the translation copy thereof.

DETAILED DESCRIPTION OF PREFERRED EMBODIMENT

Figure 1:
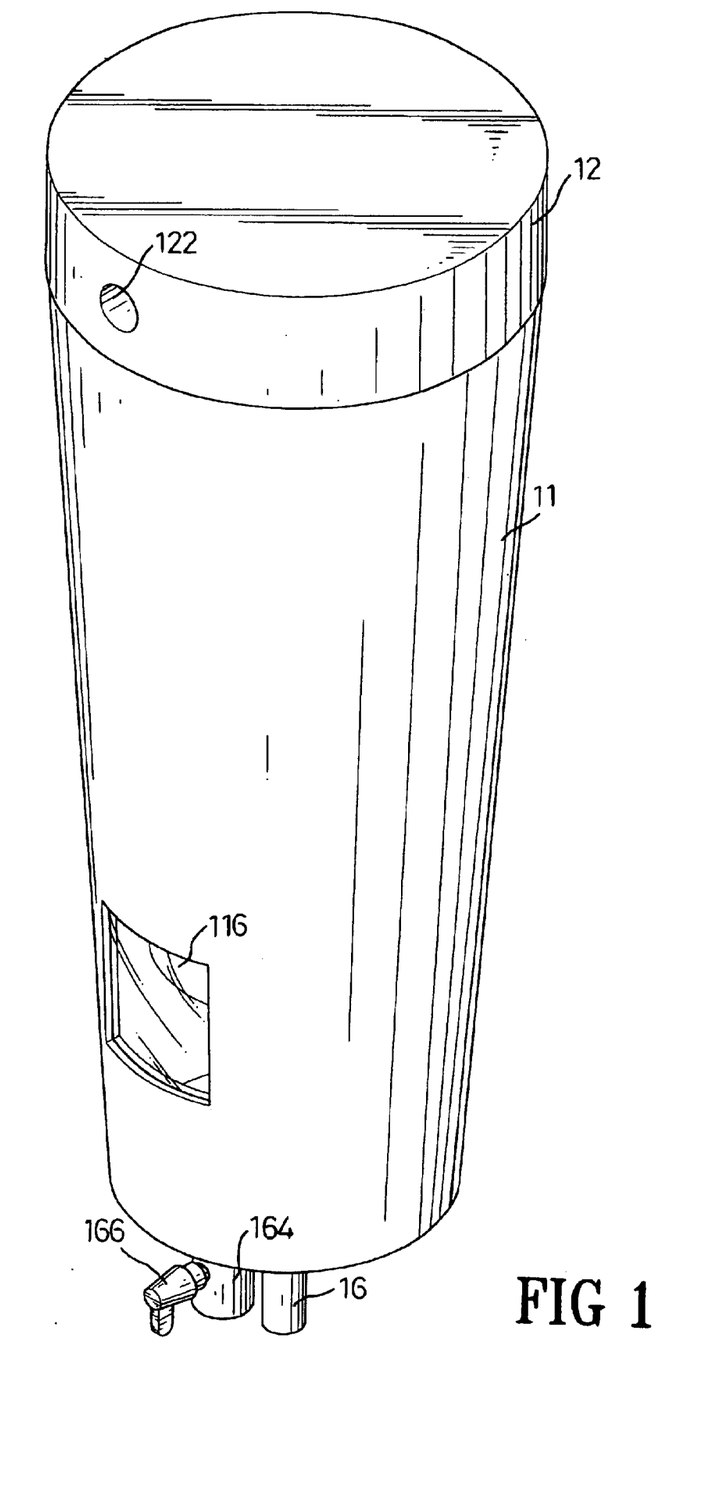
FIG. 1 is a perspective view of a water remover in accordance with the present invention.
Figure 2:
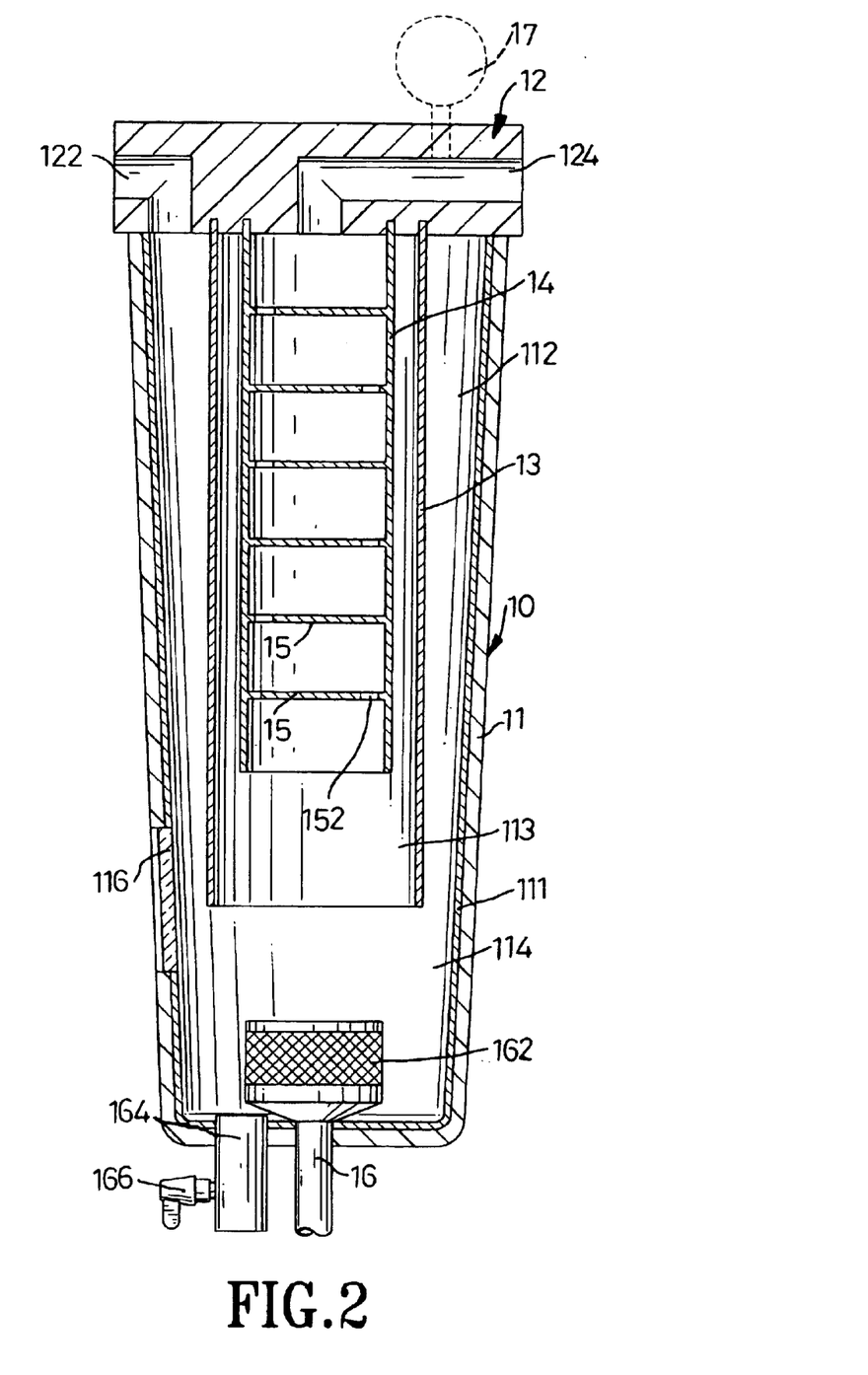
FIG. 2 is a side plan view in partial cross section of a first embodiment of the water remover in FIG. 1.

With reference to FIGS. 1 and 2, a water remover (10) for an air compressor system in accordance with the present invention comprises a housing (11) and at least one baffle (13) mounted in the housing (11). The housing (11) has a chamber, an inlet (122) and an outlet (124). The inlet (122) is defined in the housing (11) and communicates with the chamber, and the outlet (124) defined in the housing (11) and communicates with the chamber. In practice, the housing (11) has a closed end and an opening end, and a cover (12) is mounted on the opening end to close the opening end. The inlet (122) and the outlet (124) are defined in the cover (12). The inlet (122) is connected to the filter (52) of the air compressor system as shown in FIG. 9, and the outlet (124) is connected to a terminal machine (53). In addition, a lining (111) is mounted in the housing (11), and a pressure meter (17) is mounted on the cover (12) and to the meter (17) detects the pressure of the air exhausted from the outlet (124).

The baffles (13) are formed in the housing (11) to divide the chamber into multiple air channels (112,113) and a water collection segment (114) communicating with at least one of the air channels (112,113). Each respective air channel (112,113) communicates one of the other air channels (112, 113). One of the air channels (112) communicates with the inlet (122) in the housing (11), and the other one of the air channels (113) communicates with the outlet (124) in the housing (11). In practice, a tubular body is attached to the cover (12) and extends into the chamber in the housing (11) to serve as the baffle (13). The tubular body divides the chamber in the housing into an external air channel (112) communicating with the inlet (122) and an inner air channel (113) communicating with the outlet (124). The external air channel (112) communicates with the inner air channel (113) through a space in the chamber below the baffle (13), and the space in the chamber below the baffle (13) serves as the water collection segment (114).

An inner tube (14) is attached to the cover (12) and is received in the baffle (13). The inner tube (14) has a length shorter than that of the baffle (13). Multiple partition walls (15) are formed in the inner tube (14) and are parallel to each other to divide the inner tube (14) into multiple inner chambers (not numbered). The uppermost inner chamber communicates with the outlet (122), and the lowermost inner chamber communicates with the inner air channel (113) in the baffle (13). A vent (152) is defined in each respective partition wall (15) to communicate the adjacent inner chambers in the inner tube (14). The vent (152) in each partition wall (15) is not alignment with the vent (152) in the adjacent partition wall (15).

In addition, two exhausting pipes (16,164) are mounted on the closed end of the housing (11) and communicate with the water collection segment (114) in the housing (11), such that the water in the water collection segment (114) can be released from the exhausting pipes (16,164). A net filter (162) is mounted on the opening in the exhausting pipe (16). A releasing valve (166) is mounted on one of the exhausting pipes (166) to control the water in the water collection segment (114) to be released from the exhausting pipe (166). A window (116) is mounted on the housing (11) and corresponds to the water collection segment (114) in the housing, such that the user can monitor the condition in the water collection segment (114) through the window (116).

Figure 3:
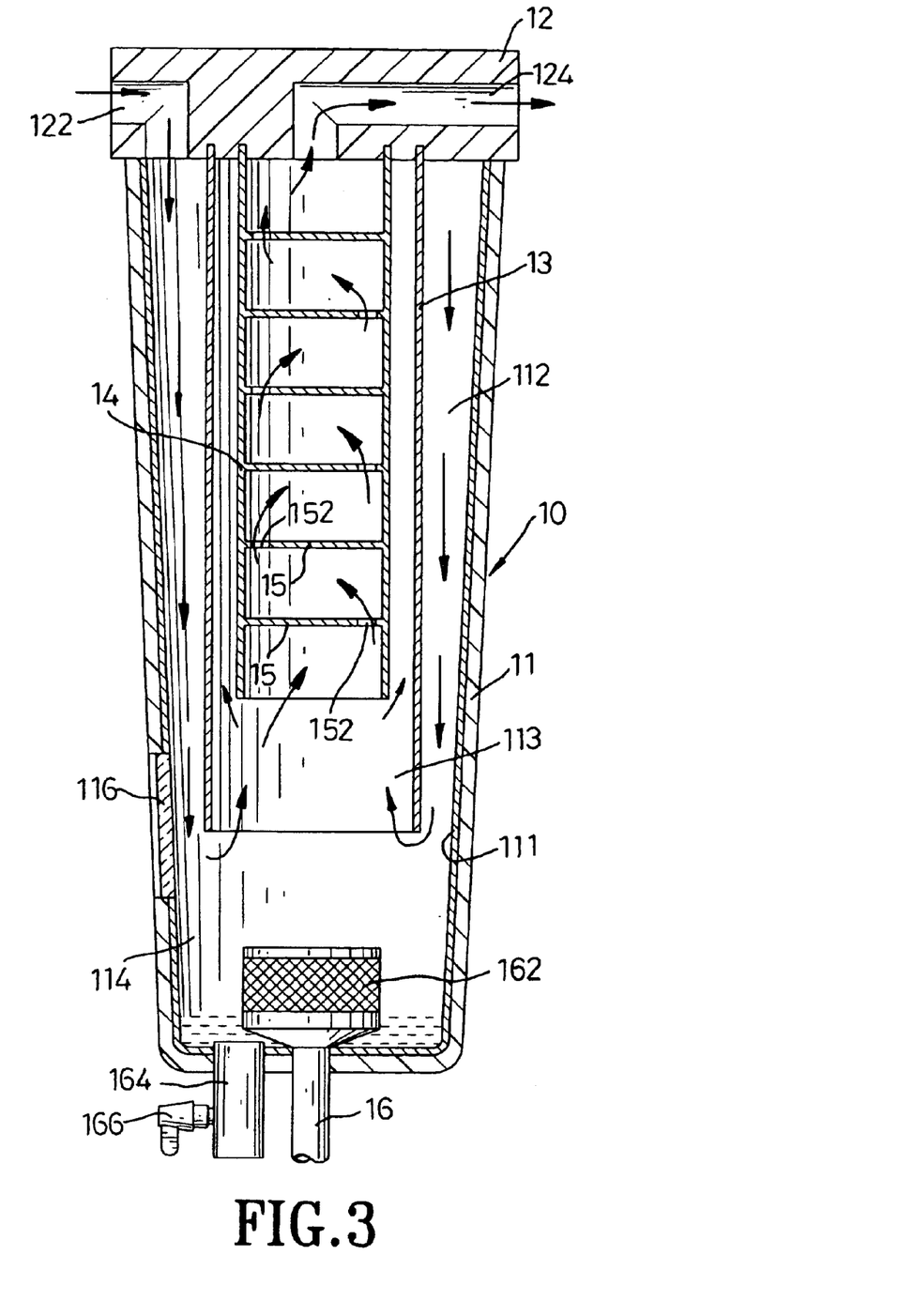
FIG. 3 is an operational side plan view in partial cross section of the first embodiment of the water remover in FIG. 1.

With reference to FIGS. 2 and 3, when the high-pressured air enters into the housing (11) through the inlet (122), the air will flow along the external channel (112) and will flow into the inner channel (113) from the bottom of the baffle (13). The air will flow out from the housing (11) through the vents (152) in the partition walls (15), the inner chambers in the inner tube (14) and the outlet (124). With the arrangements of the baffle (13) and the inner tube (14), the airflow of the air from the inlet (122) to the outlet (124) is tortuous. Due to the tortuous airflow channel, the moisture in the high-pressured air will condense on the surfaces of the housing (10), the baffle (13), the inner tube (14) and the partition walls (15), and the condensed drops of water will be collected in the water collection segment (114) in the housing (11). Consequently, the moisture will be removed from the air, and this can keep the terminal machine from being damaged by the moisture. With reference to the Appendix, over 99% of moisture in the air can be removed from the high-pressured air with the water remover (10) in accordance with the present invention.

With the water remover (10), only little power is needed for the operation of the water remover (10), such that the use of the water remover (10) is convenient and economical. In addition, the structure of water remover (10) in accordance with the present invention is simple so that the cost for manufacturing the water remover (10) is low.

Figure 4:
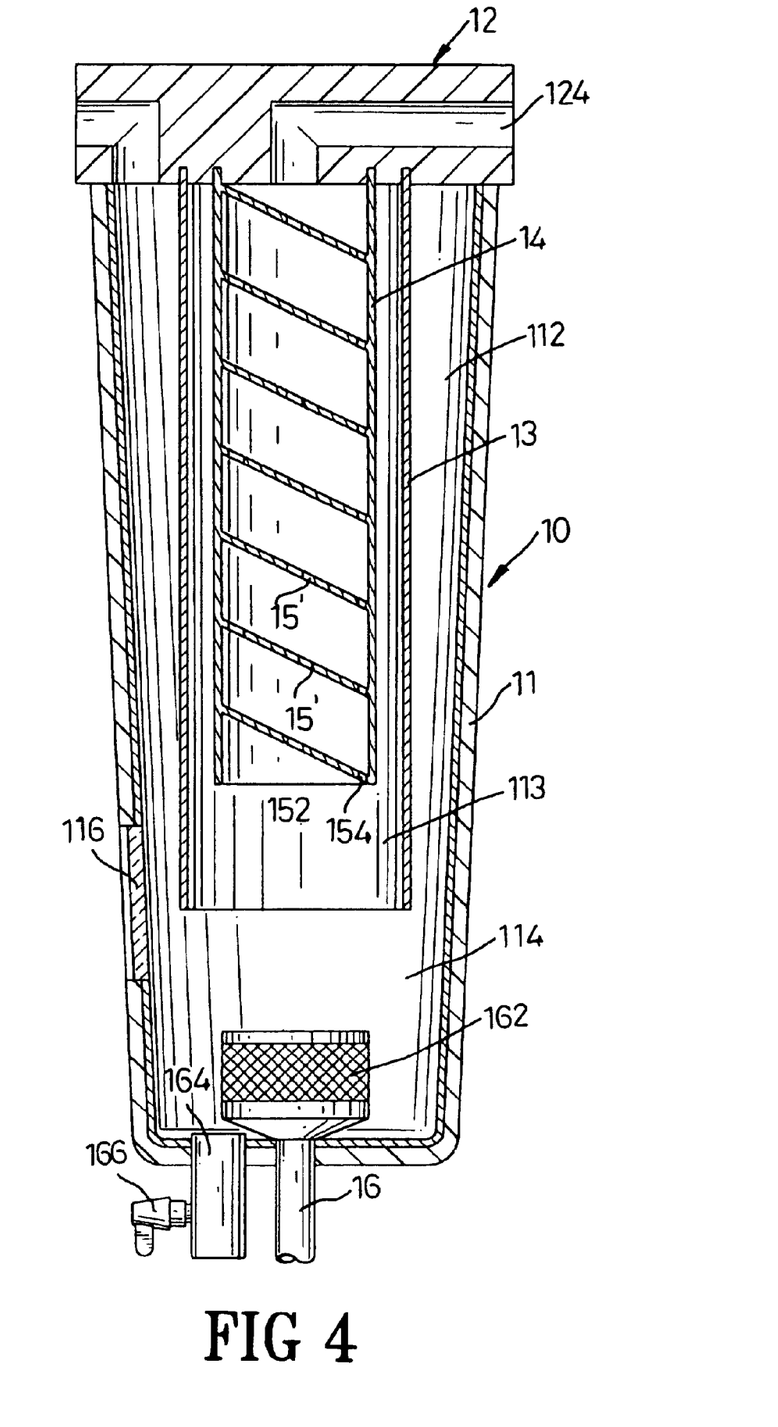
FIG. 4 is a side plan view in partial cross section of a second embodiment of the water remover in FIG. 1.

With reference to FIG. 4, each partition wall (15') is inclined relative to a diametric direction of the inner tube (14) and is parallel to each other. A bore (154) is defined in a lowermost end of each respective partition wall (15') for the water drops condensed on the surface of the partition walls (15') dropping to the lower inner chamber or the water collection segment (114) through the bores (154).

Figure 5:
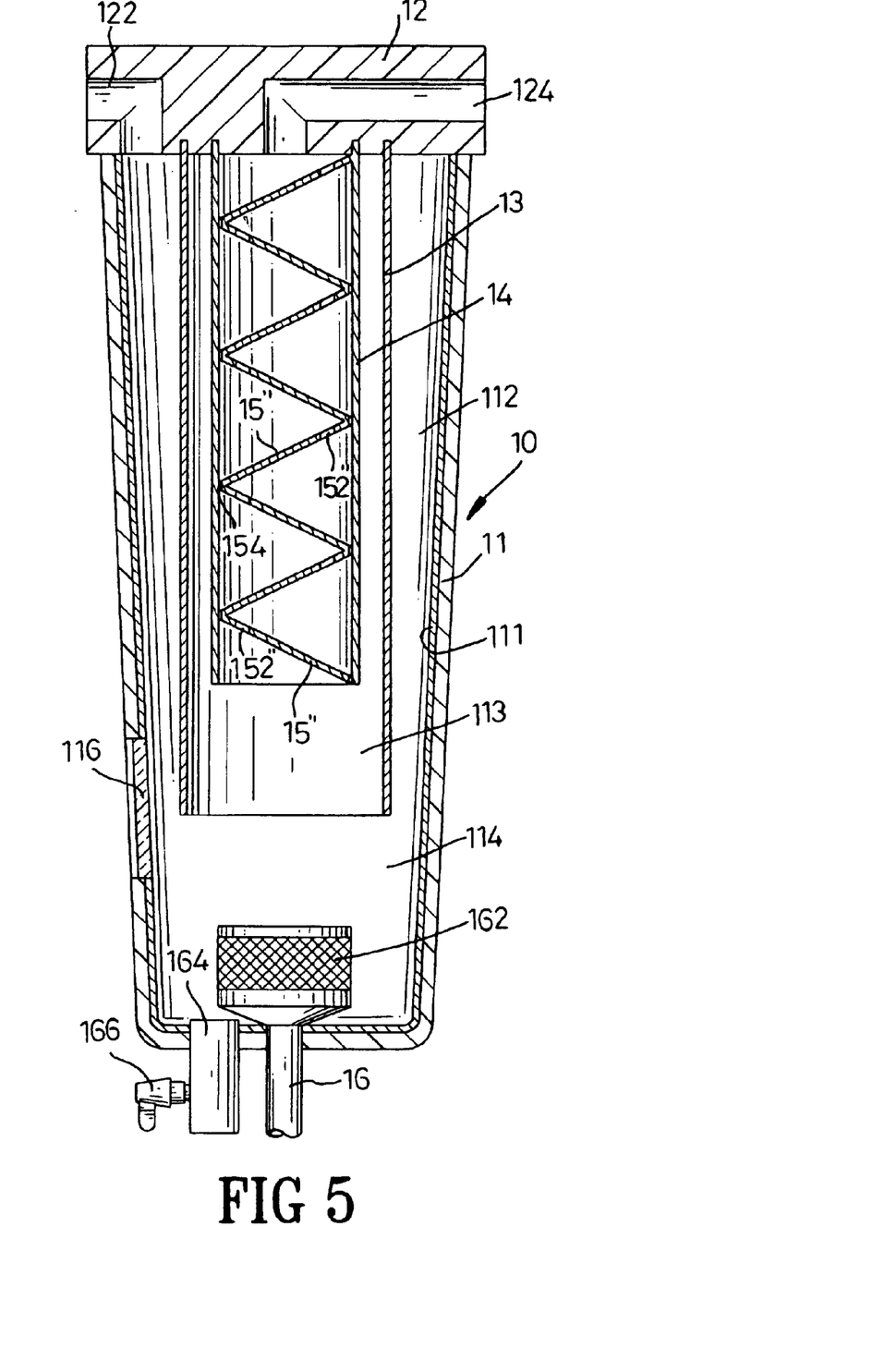
FIG. 5 is a side plan view in partial cross section of a third embodiment of the water remover in FIG. 1.

With reference to FIG. 5, each partition wall (15") is inclined relative to a diametric direction of the inner tube (14) and is connected to the adjacent partition wall (15"). A bore (154) is defined in a lowermost end of each respective partition wall (15") for the water dropping to the lower inner chamber or the water collection segment (114) through the bores (154).

Figure 6:
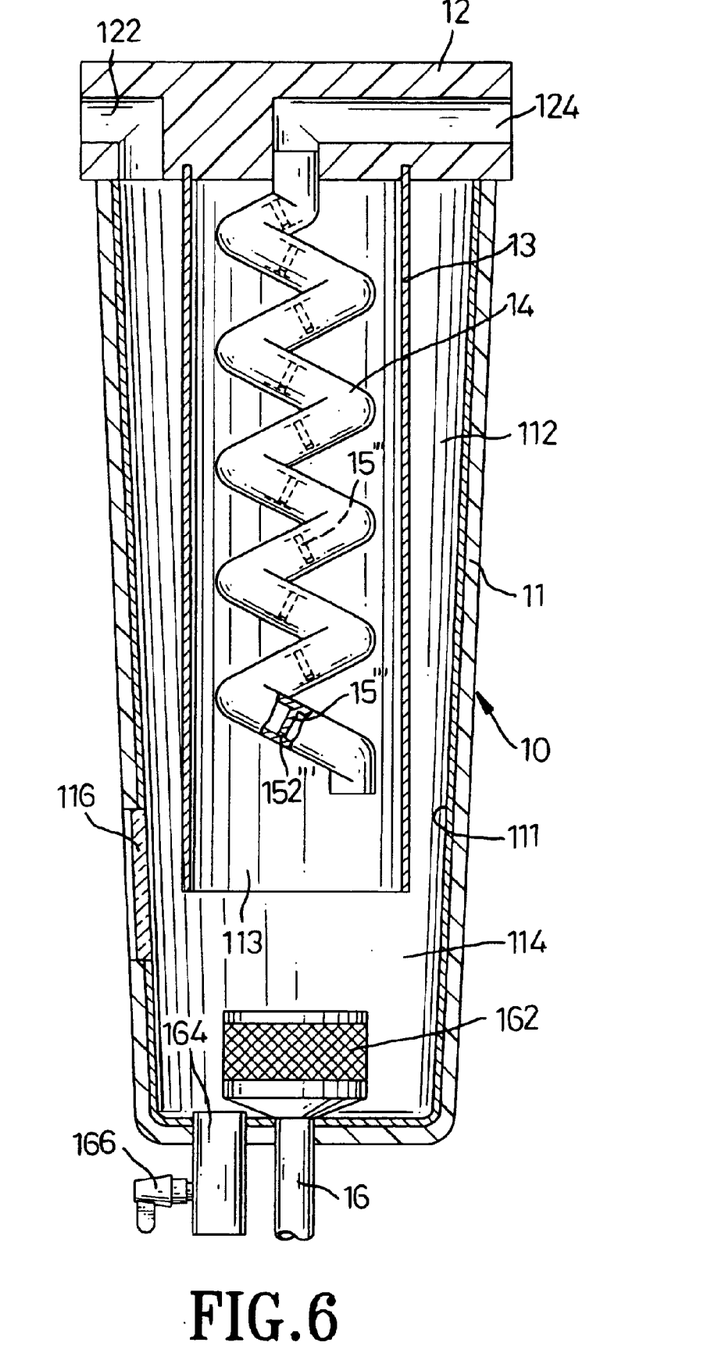
FIG. 6 is a side plan view in partial cross section of a fourth embodiment of the water remover in FIG. 1.

With reference to FIG. 6, the inner tube (14) is a tortuous tube and the vent (152''') is defined in a lowermost end of each respective partition wall (15'''). With the bend of the inner tube (14), a tortuous channel for the high-pressured air is provided in the inner tube (14).

Figure 7:
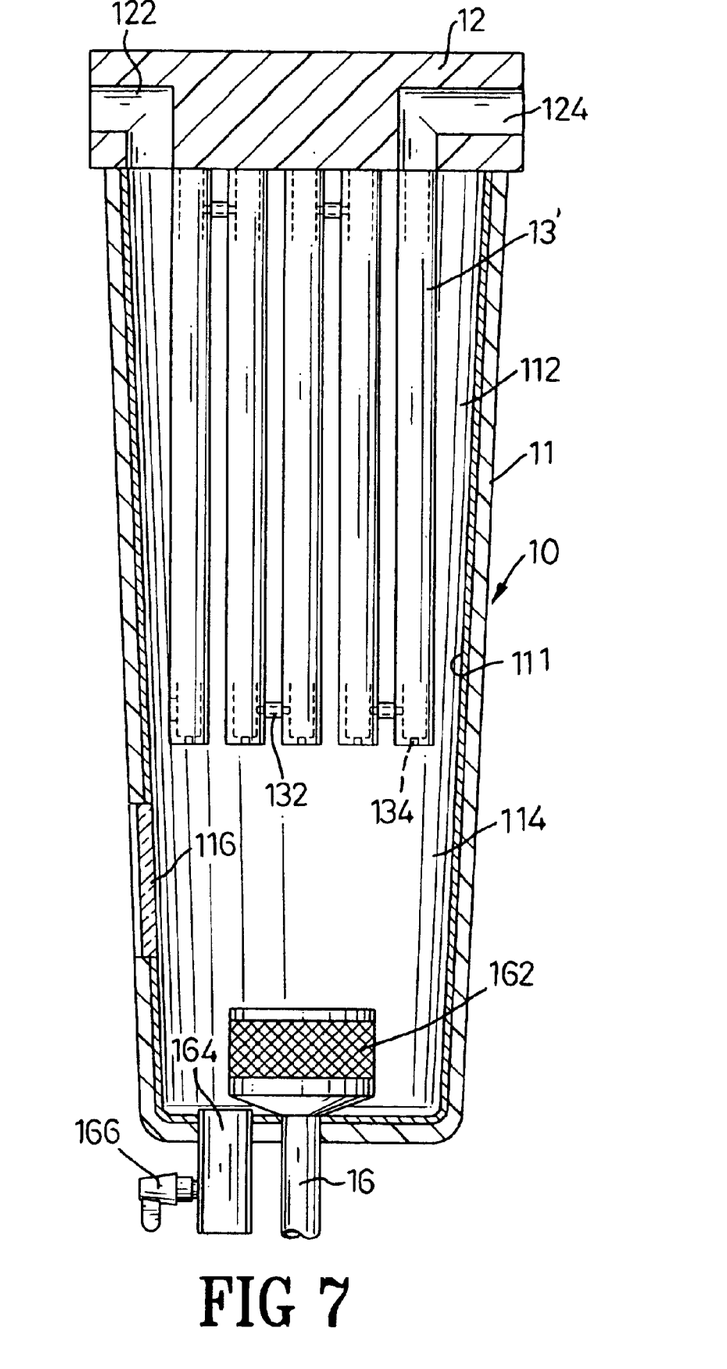
FIG. 7 is a side plan view in partial cross section of a fifth embodiment of the water remover in FIG. 1.

With reference to FIG. 7, the baffles (13') are multiple tubes attached to the cover (12) and extend into the housing (10). A tubular bridge (132) is mounted between the adjacent tubes to communicate the tubes. One of the tubes communicates with the inlet (122), and the other one of the tubes communicates with the outlet (124). A bore (134) is defined in the bottom of each respective tube for the water drops condensed on the inner surfaces of the tubes dropping into the water collection segment (114) in the housing (11). With the tubes and the bridges (132), a tortuous air channel for the high-pressured air is provided.

Figure 8:
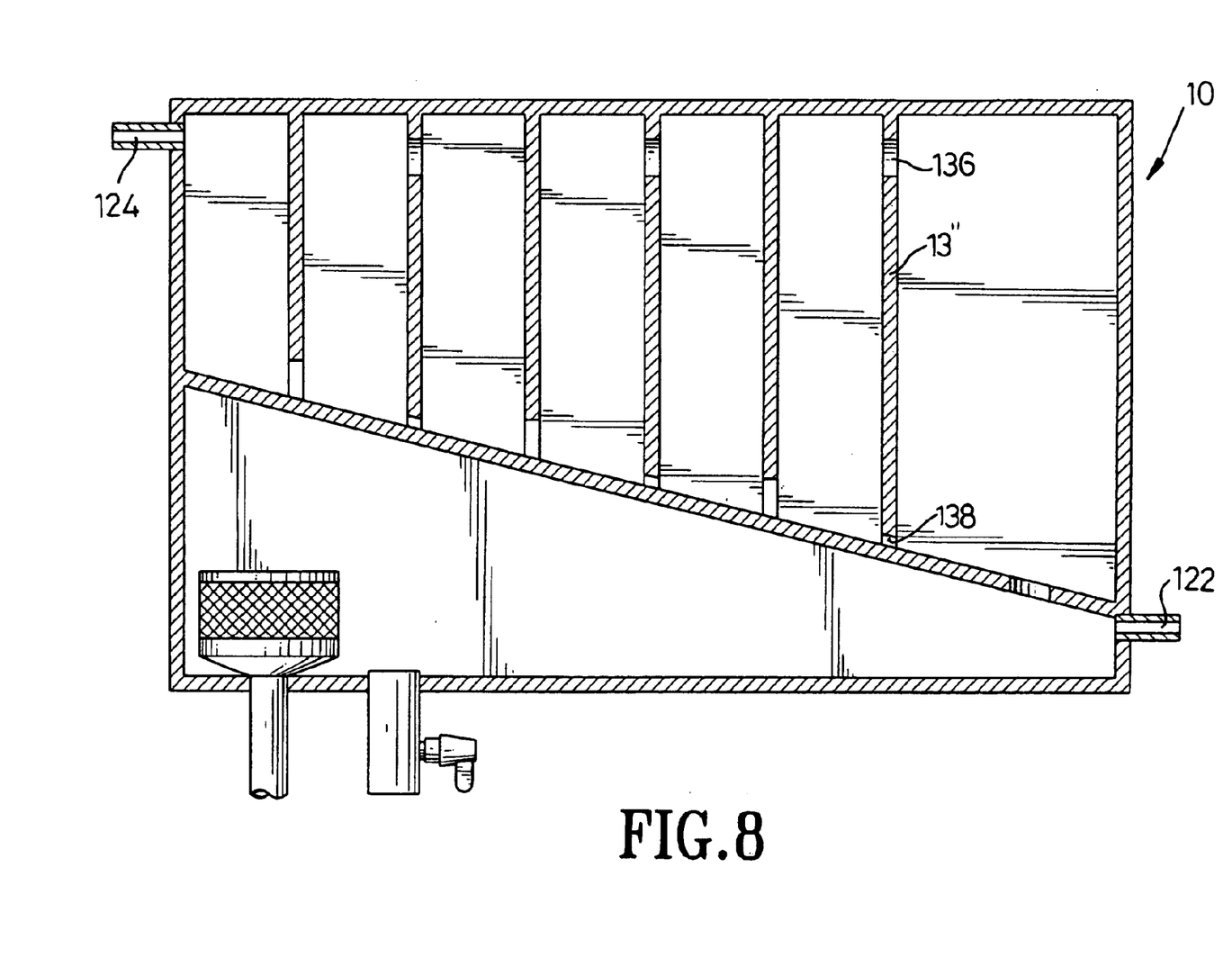
FIG. 8 is a side plan view in partial cross section of an eighth embodiment of a water remover in accordance with the present invention.

With reference to FIG. 8, the baffles (13") are multiple walls integrally formed on the inner surface of the housing (11) to divide the chamber into multiple air channels. A vent (136) is defined in each respective baffle (13") to communicate the adjacent two air channels. One of the air channels communicates with the inlet (122), and the other one of the air channels communicates with the outlet (124). In practice, the air channel communicating with the inlet (122) is arranged on the bottom of the housing (10) and is located below the other air channels so as to serve as the water collection segment simultaneously. A bore (138) is defined in the lowermost end of each respective baffle (13") for the water drops flowing into the water collection segment.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A water remover for an air compressor system comprising:

a housing with a chamber and having an inlet defined in the housing and communicating with the chamber and an outlet defined in the housing and communicating with the chamber;

at least one baffle formed in the housing to divide the chamber into multiple air channels and a water collection segment communicating with at least one of the air channels so as to define a tortuous air-flowing channel in the housing;

wherein each respective air channel communicates with one of the other air channels;

one of the air channels communicates with the inlet in the housing and another one of the air channels communicates with the outlet in the housing, the inlet and the outlet are defined in the cover;

the housing has a closed end and an opening end;

a cover is mounted on the opening end to close the opening end;

the at least one baffle is a tubular body attached to the cover and extending into the chamber in the housing to divide the chamber into an external air channel communicating with the inlet and an inner air channel communicating with the outlet;

an inner tube is attached to the cover and received in the tubular body, the inner tube has a length shorter than that of the tubular body;

multiple partition walls are formed in the inner tube to divide the inner tube into multiple inner chambers; and a vent is defined in each respective partition wall to communicate the adjacent inner chambers;

wherein one of the inner chambers communicates with the outlet and another one of the inner chambers communicates with the inner air channel in the tubular body.

2. The water remover as claimed in claim 1, wherein the partition walls are parallel to each other.

3. The water remover as claimed in claim 2, wherein the vent in each partition wall is staggered with the vent in the adjacent partition wall.

4. The water remover as claimed in claim 1, wherein each partition wall is inclined relative to a diametric direction of the inner tube and is parallel to each other; and a bore is defined in a lowermost end of each respective partition wall.

5. The water remover as claimed in claim 4, wherein the vent in each partition wall is staggered with the vent in the adjacent partition wall.

6. The water remover as claimed in claim 1, wherein each partition wall is inclined relative to a diametric direction of the inner tube and is connected to the adjacent partition wall; and a bore is defined in a lowermost end of each respective partition wall.

7. The water remover as claimed in claim 6, wherein the vent in each partition wall is staggered with the vent in the adjacent partition wall.

8. The water remover as claimed in claim 1, wherein the inner tube is a tortuous tube and the vent is defined in a lowermost end of each respective partition wall.

9. The water remover as claimed in claim 1, wherein the at least one baffle comprises multiple tubes attached to the cover and extending into the housing;

a tubular bridge is mounted between the adjacent tubes to communicate the tubes; and a bore is defined in the bottom of each respective tube, wherein one of the tubes communicates with the inlet, and another one of the tubes communicates with the outlet.

10. The water remover as claimed in claim 1, wherein the at least one baffle comprises multiple walls integrally formed on the inner surface of the housing to divide the chamber into multiple air channels; and a vent is defined in each respective baffle to communicate each adjacent two air channels, wherein one of the air channels communicates with the inlet, and another one of the air channels communicates with the outlet, the air channel communicating with the inlet is arranged on a bottom of the housing and is located below another air channel so as to serve as the water collection segment; and a bore is defined in a lowermost end of each respective baffle.

* * * * *